(12) United States Patent
Zhang et al.

(10) Patent No.: US 7,664,735 B2
(45) Date of Patent: Feb. 16, 2010

(54) METHOD AND SYSTEM FOR RANKING DOCUMENTS OF A SEARCH RESULT TO IMPROVE DIVERSITY AND INFORMATION RICHNESS

(75) Inventors: Benyu Zhang, Beijing (CN); Zheng Chen, Beijing (CN); Hua-Jun Zeng, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 10/837,540

(22) Filed: Apr. 30, 2004

(65) Prior Publication Data

US 2005/0246328 A1 Nov. 3, 2005

(51) Int. Cl.
*G06F 17/00* (2006.01)
(52) U.S. Cl. ............... 707/3; 707/4; 707/5; 707/6; 707/7
(58) Field of Classification Search ............... 707/5, 707/104.1
See application file for complete search history.

(56) References Cited

U.S. PATENT DOCUMENTS

| | | | | |
|---|---|---|---|---|
| 5,020,019 A | * | 5/1991 | Ogawa | 707/5 |
| 5,576,954 A | * | 11/1996 | Driscoll | 707/3 |
| 5,598,557 A | * | 1/1997 | Doner et al. | 707/5 |
| 5,870,740 A | * | 2/1999 | Rose et al. | 707/5 |
| 6,088,692 A | * | 7/2000 | Driscoll | 707/5 |
| 6,601,075 B1 | * | 7/2003 | Huang et al. | 707/104.1 |
| 2002/0194161 A1 | * | 12/2002 | McNamee et al. | 707/2 |
| 2005/0203970 A1 | * | 9/2005 | McKeown et al. | 707/203 |

FOREIGN PATENT DOCUMENTS

WO  WO2004/025490  3/2004

OTHER PUBLICATIONS

Danilowicz et al., "Document ranking based upon Markov chains", Elsevier Science Ltd, copyright 2001, pp. 623-637.*
Goldstein, Jade et al., "Multi-Document Summarization by Sentence Extraction," Internet Article, 'Online!,' Apr. 30, 2000 (pp. 40-48).
Carbonell, Jaime and Goldstein, Jade, "The Use of MMR, Diversity-Based Reranking for Reordering Documents and Producing Summaries," ACM Digital Library, 'Online!,' 1998 (pp. 335-336).

(Continued)

*Primary Examiner*—Hung Q Pham
(74) *Attorney, Agent, or Firm*—Perkins Coie LLP

(57) ABSTRACT

A method and system for ranking documents of search results based on information richness and diversity of topics. A ranking system determines the information richness of each document within a search result. The ranking system groups documents of a search result based on their relatedness, meaning that they are directed to similar topics. The ranking system ranks the documents to ensure that the highest ranking documents may include at least one document covering each topic, that is, one document from each of the groups. The ranking system selects the document from each group that has the highest information richness of the documents within the group. When the documents are presented to a user in rank order, the user will likely find on the first page of the search result documents that cover a variety of topics, rather than just a single popular topic.

8 Claims, 5 Drawing Sheets

OTHER PUBLICATIONS

Nomoto, Tadashi and Matsumoto, Yuji, "The Diversity-Based Approach to Open-Domain Text Summarization," Information Processing & Management, Elsevier, Barking, GB, vol. 39, No. 3, May 2003 (pp. 363-389).

Zhang, Benyu et al., "Improving Web Search Results Using Affinity Graph," ACM Digital Library, 'Online!,' Aug. 2005 (pp. 504-511).

European Search Report for European Patent Application No. 05103553.3, Sep. 13, 2005 (4 pages).

Teoma, "Adding a New Dimension to Search: The Teoma Difference is Authority," Copyright 2004 (3 pages) http://sp.teoma.com/docs/teoma/about/searchwithauthority.html.

* cited by examiner

METHOD AND SYSTEM FOR RANKING DOCUMENTS OF A SEARCH RESULT TO IMPROVE DIVERSITY AND INFORMATION RICHNESS

TECHNICAL FIELD

The described technology relates generally to ranking documents of a search result identified by a search request submitted to a search engine service.

BACKGROUND

Many search engine services, such as Google and Overture, provide for searching for information that is accessible via the Internet. These search engine services allow users to search for display pages, such as web pages, that may be of interest to users. After a user submits a search request that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to extract the keywords of each web page. To crawl the web, a search engine service may use a list of root web pages to identify all web pages that are accessible through those root web pages. The keywords of any particular web page can be extracted using various well-known information retrieval techniques, such as identifying the words of a headline, the words supplied in the metadata of the web page, the words that are highlighted, and so on. The search engine service may calculate a relevance score that indicates how relevant each web page is to the search request based on closeness of each match, web page popularity (e.g., Google's PageRank), and so on. The search engine service then displays to the user the links to those web pages in an order that is based on their relevance. Search engines may more generally provide searching for information in any collection of documents. For example, the collections of documents could include all U.S. patents, all federal court opinions, all archived documents of a company, and so on.

The highest ranking web pages of a search result provided by a web-based search engine service may be all directed to the same popular topic. For example, if a user submits a search request with the search term "Spielberg," then the highest ranking web pages of the search result would likely be related to Steven Spielberg. If the user, however, was not interested in Steven Spielberg, but was instead interested in locating a home page for a mathematics professor with the same last name, then the ranking of the web pages would not be helpful to the user. Although the professor's home page may be included in the search result, the user may need to review several pages of links to the web pages of the search result to locate the link to the professor's home page. In general, it may be difficult for users to locate a desired document when it is not identified on the first page of a search result. Moreover, users can become frustrated when they have to page through multiple pages of a search result to find a document of interest.

It would be desirable to have a technique for ranking documents that would provide a greater diversity of topics within the highest ranking documents, and it would be further desirable to have each of such highest ranking documents be very rich in information content relating to its topic.

SUMMARY

A system ranks documents of search results based on information richness and diversity of topics. A ranking system groups documents of a search result based on their relatedness, meaning that they are directed to similar topics. The ranking system ranks the documents to ensure that the highest ranking documents include at least one document covering each topic. The ranking system then selects the document from each group that has the highest information richness of the documents within the group as one of the highest ranking documents.

DETAILED DESCRIPTION

Figure 1:
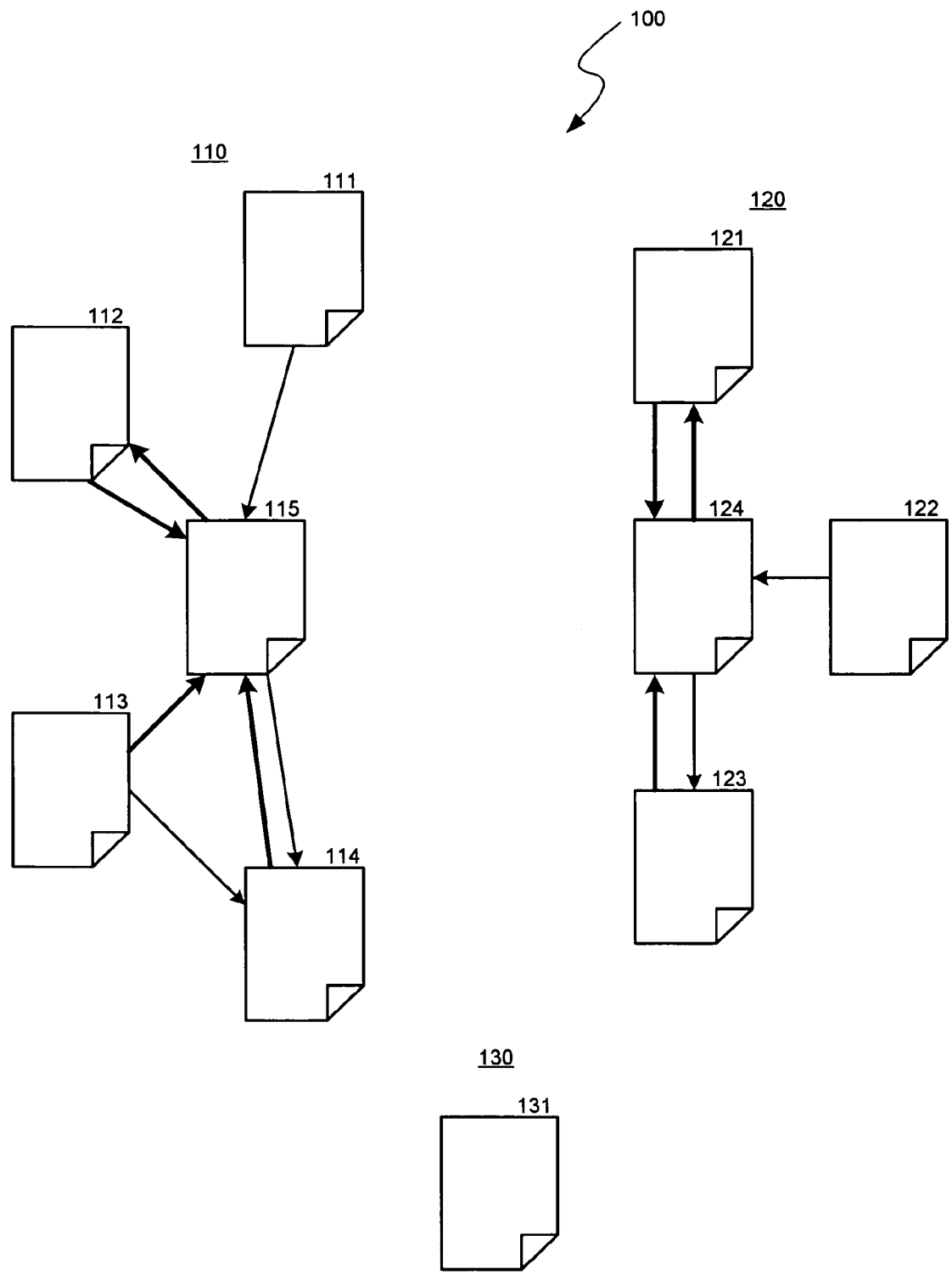
FIG. 1 is a diagram that illustrates an affinity graph in one embodiment.

A method and system for ranking documents of search results based on information richness and diversity of topics is provided. In one embodiment, a ranking system determines the information richness of each document within a search result. Information richness is a measure of how much information a document contains relating to its topics. A document (e.g., web page) with high information richness will likely contain information that subsumes information of documents that are related to the same topic but have lower information richness. The ranking system groups documents of a search result based on their relatedness, meaning that they are directed to similar topics. The ranking system ranks the documents to ensure that the highest ranking documents may include at least one document covering each topic, that is, one document from each of the groups. The ranking system selects the document from each group that has the highest information richness of the documents within the group. When the documents are presented to a user in rank order, the user will likely find on the first page of the search result documents that cover a variety of topics, rather than just a single popular topic. For example, if the search request includes the search term "Spielberg," then one document on the first page of the search result may be related to Steven Spielberg, while another document on the first page may be related to a Professor Spielberg. In this way, a user will more likely be presented with documents covering a diversity of topics on the first page of the search result and will less likely become frustrated when the topic of interest is not the most popular topic relating to the search request. Moreover, because the ranking system ranks documents with higher information richness higher than documents with a lower information richness, the user is more likely to find the desired information within a document presented on the first page of the search result.

In one embodiment, the ranking system calculates the information richness of documents of a search result based on an affinity graph. Affinity is a measure of to what extent the information of one document is subsumed by the information of another document. For example, a document that describes one of Spielberg's movies superficially may have a high affinity to a document that describes all of Spielberg's movies in detail. Conversely, the document that describes all of Spielberg's movies in detail may have a relatively low affinity to the document that describes one of Spielberg's movies superficially. Documents that are related to very different topics would have no affinity to each other. The collection of affinities of each document to every other document represents the affinity graph. A document that has many other documents that have a high affinity to it will likely have high information richness because its information subsumes the information of many other documents. Moreover, if those other documents with the high affinity also have relatively high information richness themselves, then the information richness of the document is even higher.

In one embodiment, the ranking system helps ensure diversity of the high ranking documents of a search result also using an affinity graph. The ranking system may have an initial ranking score of the documents based on a conventional ranking technique (e.g., relevance), an information richness technique, or some other ranking technique. The ranking system initially selects the document with the highest initial ranking score as the document with the highest final ranking score. The ranking system then reduces the ranking score of each document that has a high affinity to the selected document. The ranking system reduces the ranking score because the content of those documents is likely to be subsumed by the selected document and would represent redundant information. The ranking system then selects that document of the remaining documents that has the then-highest ranking score. The ranking system reduces the ranking score of each document that has a high affinity to that newly selected document. The ranking system repeats this process until a desired number of documents have a final ranking score, all the documents have a final ranking score, or some other termination condition is met. In one embodiment, diversity represents the number of different topics in a collection of documents, and information richness of a document in a collection denotes the informative degree of the document with respect to the entire collection.

One skilled in the art will appreciate that the documents of search results can be ranked based on information richness alone or diversity alone, rather than on a combination of information richness and diversity. A search engine service may use information richness alone, for example, by identifying groups of documents related to similar topics and determining the information richness of each document within its group. The search engine service may then factor the determined information richness into the ranking of documents so that documents with the highest information richness of their group are likely to be ranked higher than other documents within their group. The search engine service may use diversity alone, for example, by identifying groups of documents relating to similar topics and ensuring that at least one document from each group is ranked high in the search results regardless of its information richness. For example, the search engine service may select to display on the first page of the search result the document from each group with the highest relevance of the group.

An affinity graph represents documents as nodes and affinity values as the weight of directed edges between the nodes. The ranking system represents an affinity graph by a square matrix that maps each document to every other document in a collection of documents. The ranking system sets the value of elements of the matrix to the affinity of the corresponding documents. If M is the matrix, then $M_{ij}$ represents the affinity of document i to document j. The ranking system calculates the affinity of documents by representing each document as a vector. The vector represents the informational content of the document. For example, each vector may contain the 25 most important keywords of the document. The ranking system may calculate affinity according to the following:

$$aff(d_i, d_j) = \frac{\vec{d}_i \cdot \vec{d}_j}{\|\vec{d}_i\|} \qquad (1)$$

where $aff(d_i,d_j)$ is the affinity of document $d_i$ to document $d_j$, $d_i$ represents the vector of document $d_i$, $d_j$ represents the vector of document $d_{j1}$ and $\|\vec{d}_i\|$ represents the length of vector $d_i$. Equation 1 sets the affinity to the length of the projection from $d_j$ to $d_i$. One skilled in the art will appreciate that affinity can be defined in many different ways. For example, the affinity of one document to another could be defined based on the percentage of the keywords of the one document that are in the keywords of the other document. In set theory terms, the affinity of one document to another document can be expressed as the number of keywords in the intersection of two documents divided by the number of keywords in the other document. Each element of the matrix M represents a directed edge in the affinity graph from the node of one document to the node of the other document. In one embodiment, the ranking system sets an affinity value that is below an affinity threshold value (e.g., 0.2) to zero. Conceptually, this means that there is no directed edge from the node of one document to the node of the other document in the affinity graph when the affinity is low. The affinity matrix is represented by the following:

$$M_{ij} = \begin{cases} aff(d_i, d_j), & \text{if } aff(d_i, d_j) \geq aff_t \\ 0, & \text{otherwise} \end{cases} \qquad (2)$$

where $M_{ij}$ is an element of the matrix and $aff_t$ is the affinity threshold value. A group of nodes with many edges between them may represent a single topic because many of the documents in the group have an affinity greater than a threshold affinity to each other. In contrast, nodes with no links between them represent documents directed to different topics.

The ranking system calculates information richness for each document by applying an edge analysis algorithm to the affinity graph. The ranking system normalizes the affinity matrix so that the values in each row add up to 1. The normalized affinity matrix is represented by the following:

$$\tilde{M}_{ij} = \begin{cases} \dfrac{M_{i,j}}{\sum_{j=1}^{n} M_{ij}}, & \text{if } \sum_{j=1}^{n} M_{ij} \neq 0 \\ 0, & \text{otherwise} \end{cases} \qquad (3)$$

where $\tilde{M}_{ij}$ is an element of the normalized affinity matrix. The ranking system calculates information richness according to the following:

$$InfoRich(d_i) = \sum_{all\ j \ne i} InfoRich(d_j) \cdot \tilde{M}_{ji} \quad (4)$$

where InfoRich($d_i$) is the information richness of document $d_i$. Thus, information richness is defined recursively. Equation 4 can be represented in matrix form by the following:

$$\lambda = \tilde{M}^T \lambda \quad (5)$$

where $\lambda = [InfoRich(d_i)]_{n \times 1}$ is the eigenvector of the normalized affinity matrix $\tilde{M}^T$. Since the normalized affinity matrix $\tilde{M}$ is typically a sparse matrix, all-zero rows could possibly appear in it, which means that some documents have no other documents with significant affinity to them. To compute a meaningful eigenvector, the ranking system uses a dumping factor (e.g., 0.85) that may be a document ranking based on popularity of the document. The information richness using a dumping factor is represented by the following:

$$InfoRich(d_i) = c \cdot \sum_{all\ j \ne i} InfoRich(d_j) \cdot \tilde{M}_{ji} + \frac{(1-c)}{n} \quad (6)$$

where the c is the dumping factor and n is the number of documents in the collection. Equation 6 can be represented in matrix form as follows:

$$\lambda = c\tilde{M}^T \lambda + \frac{(1-c)}{n} \vec{e} \quad (7)$$

where $\vec{e}$ is a unit vector with all components equal to 1. The computation of information richness can be analogized to an information flow and sink model. With this model, information flows among the nodes at each iteration. A document $d_i$ has a set of documents $A(d_i)$ to which it has an affinity as represented by the following:

$$A(d_i) = \{d_j | \forall j \ne i, aff(d_i, d_j) > aff_t\} \quad (8)$$

In each iteration, the information can flow according to one of the following rules:

1. With a probability c (i.e., the dumping factor), the information will flow into one of the document in $A(d_i)$, and the probability of flowing into the document $d_j$ is proportional to aff($d_i, d_j$).
2. With a probability of 1-c, the information will randomly flow into any documents in the collection.

A Markov chain can be induced from the above process, where the states are given by the documents and the transition (or flow) matrix is given by $$c\tilde{M}^T + \frac{(1-c)}{n} U \quad (a)$$

where $$U = \left[\frac{1}{n}\right]_{n \times n}.$$

The stationary probability distribution of each state is given by the principal eigenvector of the transition matrix.

In one embodiment, the ranking system calculates an affinity rank by combining information richness with a similarity penalty so that multiple documents directed to the same topic are not all ranked highly to the exclusion of documents directed to other topics. The use of a similarity penalty results in an increase in the diversity of topics among the most highly ranked documents. The ranking system may use a iterative greedy algorithm to calculate the similarity penalties with the initial affinity rank of a document being set to its information richness. At each iteration, the algorithm selects the document with the next highest affinity rank and reduces the affinity rank of the documents directed to the same topic by a similarity penalty. Thus, once a document is selected, all other documents directed to the same topic will have their affinity rank reduced to improve the chance that the highest ranking documents represent diverse topics. The ranking system may reduce the affinity rank of documents according to the following:

$$AR_j = AR_j - \tilde{M}_{ji} \cdot InfoRich(d_i) \quad (10)$$

where $AR_j$ represents the affinity rank of document j and i is the selected document. Because the similarity penalty is based on the affinity matrix, the more a document is similar to the selected document, the greater its similarity penalty.

The ranking system may combine an affinity ranking with a text-based ranking (e.g., conventional relevance) to generate an overall ranking in an embodiment. The rankings can be combined based on scores or based on ranks. With combined scoring, the text-based score is combined with the affinity rank to give an overall score representing the final score of the document. The combined scoring may be based on a linear combination of the text-based score and the affinity rank. Because the scores may have different orders of magnitude, the ranking system normalizes the scores. The combined scoring may be represented by the following:

$$Score(q, d_i) = \alpha \cdot \frac{Sim(q, d_i)}{\overline{Sim_\Theta}(q)} + \beta \cdot \frac{\log \overline{AR_\Theta}}{\log AR_i}, \forall d_i \in \Theta \quad (11)$$

where $\alpha + \beta = 1$, $\Theta$ represents the search results for search request q, $Sim(q, d_i)$ represents the similarity of document $d_i$ to the search request q, and $$\overline{Sim}_\Theta(q) = Max_{\forall d_i \in \Theta} Sim(q, d_i) \quad (12)$$

$$\overline{AR}_\Theta = Max_{\forall d_i \in \Theta} AR_i \quad (13)$$

With combined ranking, the text-based ranking is combined with the affinity ranking to give a final ranking of the documents. The combined ranking may be based on a linear combination of the text-based ranking and the affinity ranking. The combined ranking may be represented by the following:

$$Score(q, d_i) = \alpha \cdot Rank_{Sim(q, d_i)} + \beta \cdot Rank_{AR_i}, \forall d_i \in \Theta \quad (14)$$

where Score represents the final ranking for document $d_i$ for the search request q, $Rank_{Sim(q,d_i)}$ represents the text-based ranking, and $Rank_{ARi}$ represents the affinity ranking. The α and β in both combining algorithms are parameters that can be tuned. When α=1 and β=0, no re-ranking is performed, and the search result is ranked based on the text-based search. When β>α, more weight is put on the affinity ranking when re-ranking. When β=1 and α=0, the re-ranking is performed based solely on the affinity ranking.

FIG. 1 is a diagram that illustrates an affinity graph in one embodiment. The affinity graph 100 includes nodes 111-115, nodes 121-124, and node 131, which each represent a document. The directed edges between the nodes indicate the affinity of one node to another. For example, node 111 has an affinity to node 115, but node 115 does not have an affinity (or has an affinity below a threshold level) to node 111. In this example, the node group 110 comprises nodes 111-115 that are directed to the same topic, because there are many edges between the nodes in that node group. Similarly, the node group 120 comprises nodes 121-124 that are directed to the same topic. Node group 130 has only one node because that node does not have an affinity to any other node and no node has an affinity to it. Node 115 is likely to have the highest information richness of all the nodes in node group 110 and node 124 is likely to have the highest information richness of all the nodes in node group 120 because each node has the greatest number of nodes who have an affinity to it.

Figure 2:
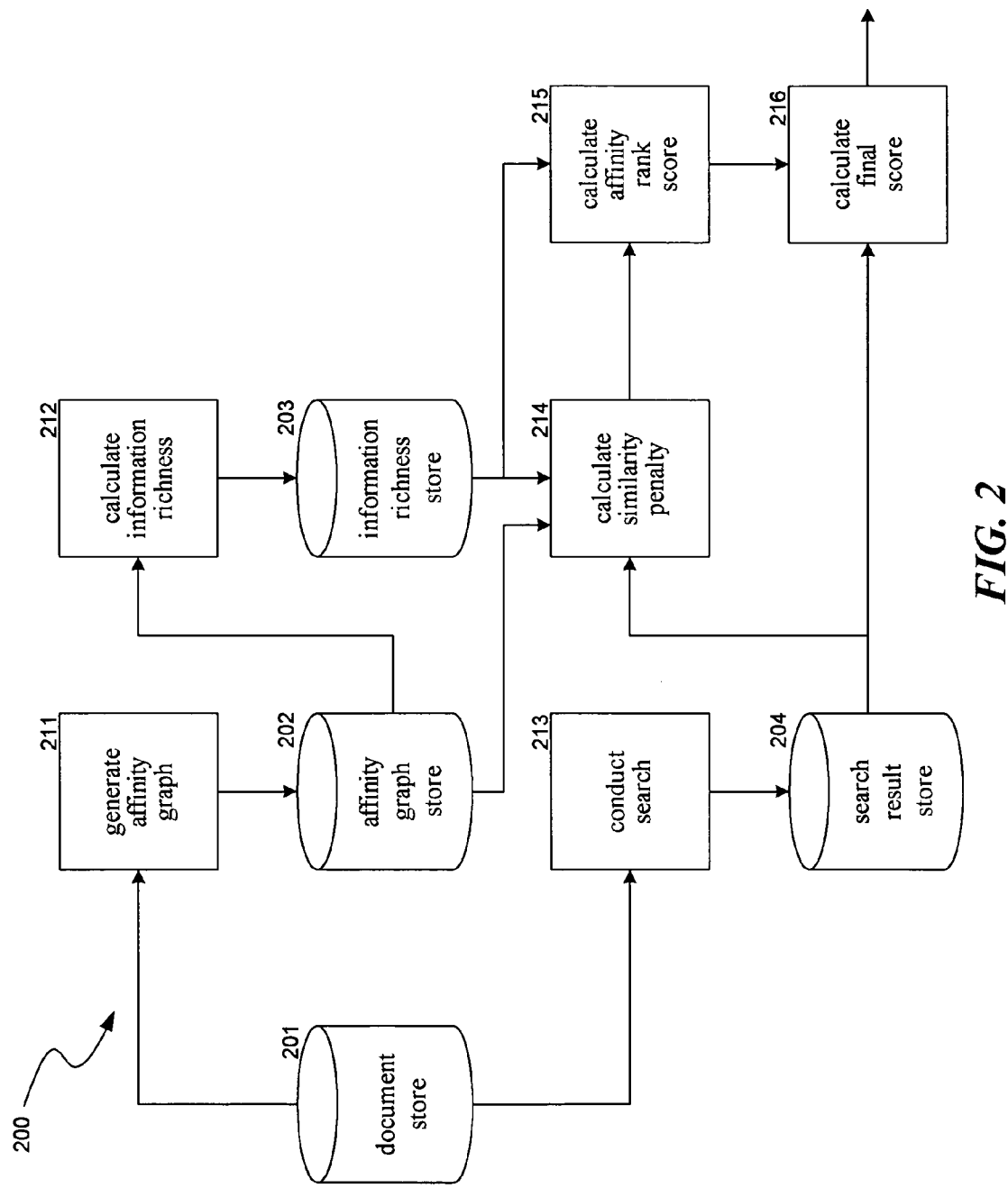
FIG. 2 is a block diagram that illustrates components of the ranking system in one embodiment.

FIG. 2 is a block diagram that illustrates components of the ranking system in one embodiment. The ranking system 200 includes data stores 201-204 and components 211-216. The document store 201 contains the collection of documents and may represent all web pages available via the Internet. The generate affinity graph component 211 generates an affinity graph based on the documents of the document store. The generate affinity graph component stores the affinities in the affinity graph store 202. The calculate information richness component 212 inputs the affinity graph from the affinity graph store and calculates an information richness score for each document. The component stores the calculated information richness scores in the information richness store 203. In one embodiment, the generate affinity graph component and the calculate information richness component can execute off-line to generate the affinity graph and the information richness scores prior to the conducting of a search. The conduct search component 213 receives a search request from a user and identifies the search result from the documents in the document store. The conduct search component stores the search result in the search result store 204 along with an indication of the relevance of each document of the search result to the search request. The calculate similarity penalty component 214 calculates a similarity penalty to apply to the affinity rank based on the information of the search result store, the affinity graph store, and the information richness store. The calculate affinity rank component 215 generates an affinity rank for each document in the search result. The calculate affinity rank component factors in the information richness of the document, the affinity graph store, and the search result. The calculate final score component 216 combines the affinity rank and relevance score to calculate a final score.

The computing device on which the ranking system is implemented may include a central processing unit, memory, input devices (e.g., keyboard and pointing devices), output devices (e.g., display devices), and storage devices (e.g., disk drives). The memory and storage devices are computer-readable media that may contain instructions that implement the ranking system. In addition, the data structures and message structures may be stored or transmitted via a data transmission medium, such as a signal on a communications link. Various communications links may be used, such as the Internet, a local area network, a wide area network, or a point-to-point dial-up connection.

The ranking system may be implemented in various operating environments. Various well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
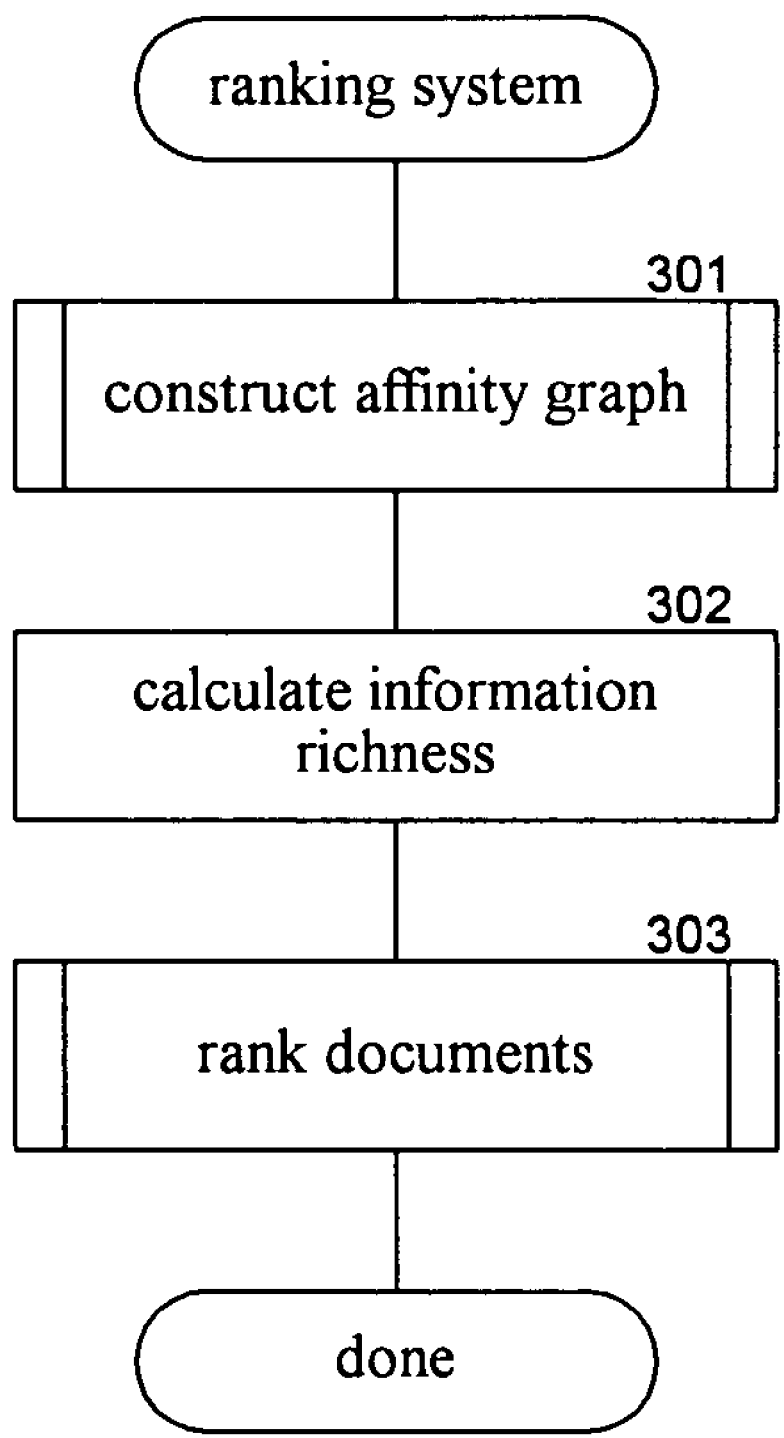
FIG. 3 is a flow diagram illustrating the overall processing of the ranking system in one embodiment.

FIG. 3 is a flow diagram illustrating the overall processing of the ranking system in one embodiment. The ranking system is provided with a collection of documents that may represent a search result. In block 301, the component constructs an affinity graph for the collection of documents. The component may construct an affinity graph covering all documents in a corpus of documents (e.g., all web pages) off-line or covering only the documents of the collection in real time. In block 302, the component calculates the information richness of each document of the collection. In block 303, the component ranks the documents of the collection and then completes.

Figure 4:
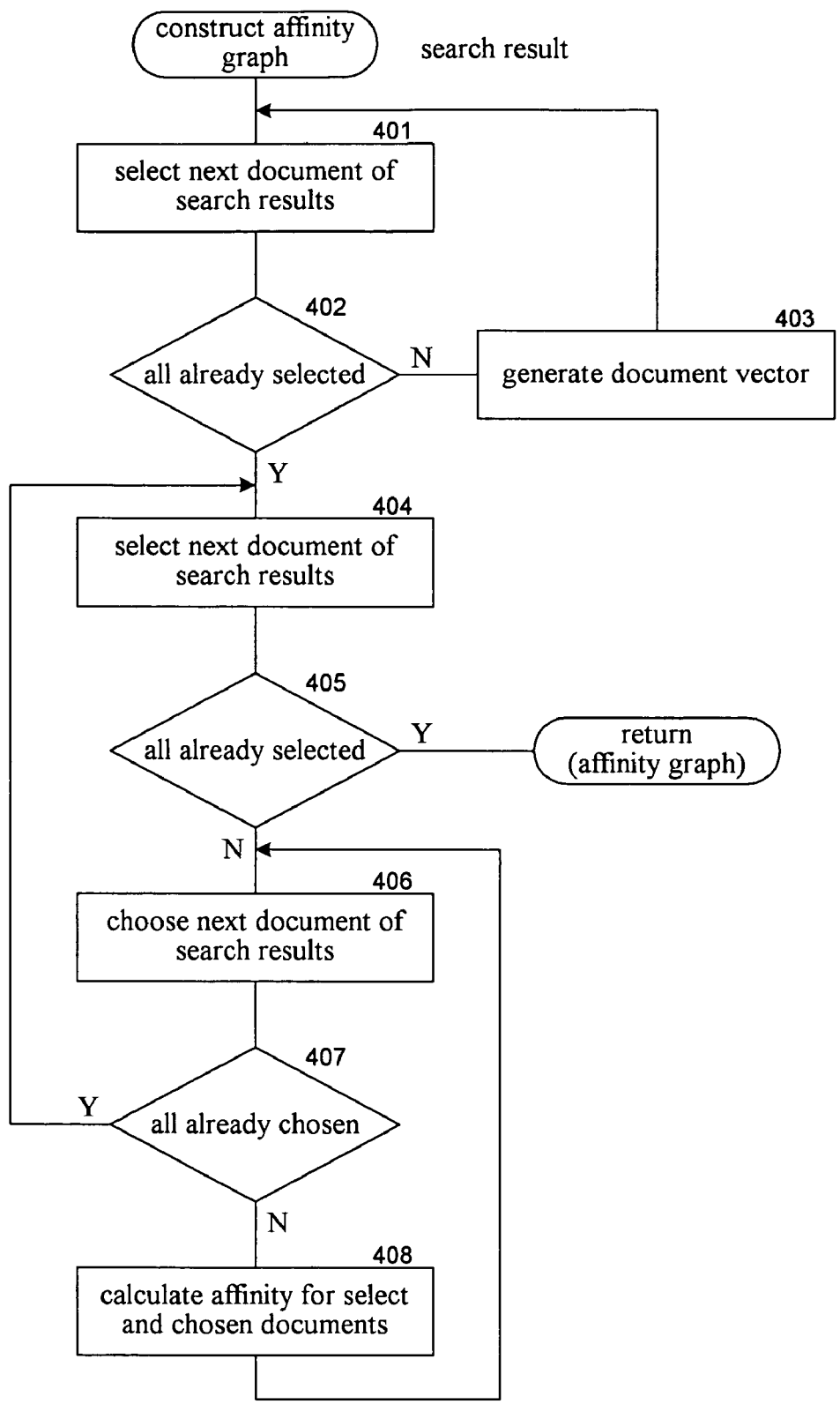
FIG. 4 is a flow diagram that illustrates the processing of a construct affinity graph component in one embodiment.

FIG. 4 is a flow diagram that illustrates the processing of a construct affinity graph component in one embodiment. The component is passed a collection of documents and constructs an affinity graph for those documents. In blocks 401-403, the component loops generating a document vector for each document in a collection of documents. In block 401, the component selects the next document in the collection. In decision block 402, if all the documents in the collection have already been selected, then the component continues at block 404, else the component continues at block 403. In block 403, the component generates the document vector for the selected document and then loops to block 401 to select the next document in the collection. In blocks 404-408, the component calculates the affinity for each pair of documents in the collection. In block 404, the component selects the next document in the collection starting with the first document. In decision block 405, if all the documents have already been selected, then the component returns the affinity graph, else the component continues at block 406. In blocks 406-408, the component loops choosing each document of the collection. In block 406, the component chooses the next document in the collection starting with the first document. In decision block 407, if all the documents in the collection have already been chosen, then the component loops to block 404 to select the next document in the collection, else the component continues at block 408. In block 408, the component calculates the affinity of the selected document to the chosen document according to Equation 1 and then loops to block 406 to choose the next document in the collection.

Figure 5:
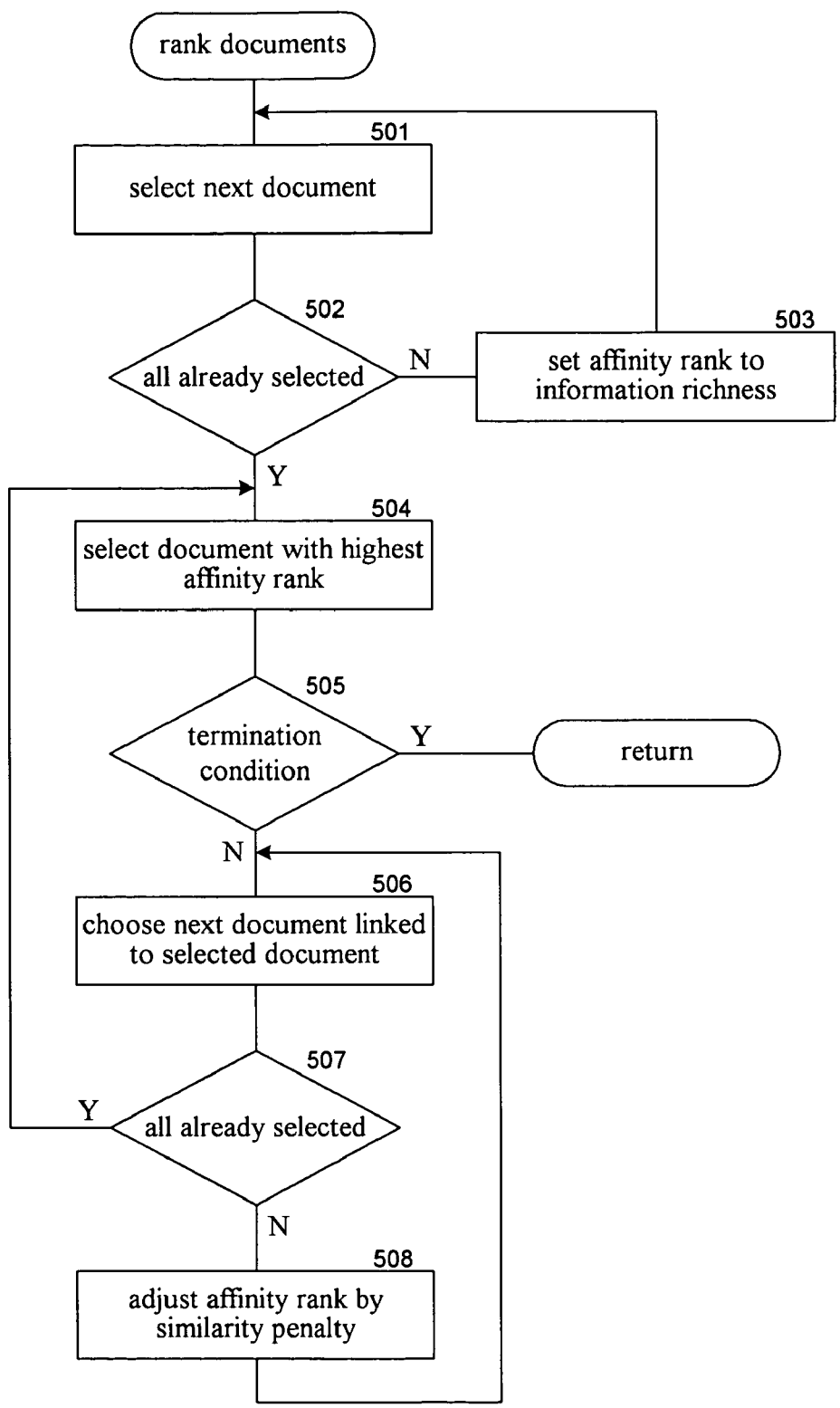
FIG. 5 is a flow diagram that illustrates the processing of a rank documents component in one embodiment.

FIG. 5 is a flow diagram that illustrates the processing of a rank documents component in one embodiment. The component is passed a collection of documents that has had its affinity graph generated and the information richness of each document calculated. In blocks 501-503, the component loops initializing the affinity rank of each document in the collection to its information richness. In block 501, the component selects the next document in the collection. In decision block 502, if all the documents have already been selected, then the component continues at block 504, else the component continues at block 503. In block 503, the component sets the affinity rank of the selected document to the information richness of the selected document and then loops to block 501 to select the next document in the collection. In blocks 504-508, the component loops identifying pairs of documents and adjusting affinity ranks by a similarity penalty. In block 504, the component selects the next document with the highest affinity rank. In decision block 505, if a termination condition has been reached, then the component returns the ranked documents, else the component continues at block 506. In blocks 506-508, the component loops choosing documents and adjusting the affinity rank by the similarity penalty. In block 506, the component chooses the next document that has an affinity to the selected document as indicated by a non-zero value in the affinity graph for the affinity from the chosen document to the selected document. In decision block 507, if all those documents have already been chosen, then the component loops to block 504 to select the next document with the highest affinity rank. In block 508, the component adjusts the affinity rank for the chosen document by a similarity penalty according to Equation 10. The component then loops to block 506 to choose the next document with an affinity to the selected document.

One skilled in the art will appreciate that although specific embodiments of the ranking system have been described herein for purposes of illustration, various modifications may be made without deviating from the spirit and scope of the invention. In one embodiment, the ranking system may calculate the affinity and information richness on a block-by-block basis rather than a document-by-document basis. A block represents information of a web page that is generally related to a single topic. The ranking of the web page may be based in part on the importance of a block to its web page. The importance of blocks is described in U.S. Pat. No. 7,363,279 entitled "Method and System for Calculating Importance of a Block Within a Display Page," and issued on Apr. 22, 2008, which is hereby incorporated by reference. Accordingly, the invention is not limited except by the appended claims.

We claim:

1. A computing device for ranking documents of a search result, each document having words, comprising:
a memory having computer-executable instructions and a processor for executing the computer-executable instructions stored in the memory, the executed computer-executable instructions perform steps comprising:
receiving from a user a query;
identifying documents as a search result for the received query;
identifying keywords of the identified documents;
for each pair of identified documents of the search result, calculating an affinity measurement indicating affinity that a document of the pair has to the other document of the pair, wherein affinity measurement is calculated based on the following:

$$aff(d_i, d_j) = \frac{\vec{d}_i \cdot \vec{d}_j}{\|\vec{d}_i\|}$$

where aff($d_i$, $d_j$) is the affinity measurement of document $d_i$ to document $d_j$, document $d_i$ represents the document of the pair and document $d_j$ represents the other document of the pair, $\vec{d}_i$ represents a vector of document $d_i$, $\vec{d}_j$ represents a vector of document $d_j$, and $\|\vec{d}_i\|$ represents the length of vector $d_i$, each vector having at least one entry for at least one identified keyword of the corresponding document;
for each identified document of the search result, calculating information richness for the identified document based on an element of a normalized affinity matrix that is derived from an affinity matrix, wherein the information richness is calculated based on the following:

$$InfoRich(d_i) = \sum_{all\ j \neq i} InfoRich(d_j) \cdot \tilde{M}_{ji}$$

where InfoRich($d_i$) is the information richness of document $d_i$, document $d_i$ represents the identified document of the search result and document $d_j$ represents another document in the search result, and $\tilde{M}_{ji}$ is an element of the normalized affinity matrix, wherein the affinity matrix containing the calculated affinity measurement of the identified document and the another document in the search result; and
displaying indications of documents of the search result ranked based on the calculated information richnesses of the documents of the search result.

2. The computing device of claim 1 wherein the identifying of the documents including submitting the query to a search engine service and receiving indications of the documents as the search result.

3. The computing device of claim 1 wherein the documents are web pages.

4. A method in a computer system with a processor and a memory for calculating information richness of a document within a collection of documents, the documents in the collection having words, the method comprising:
identifying by the processor an affinity each document in the collection has to another document in the collection, wherein the affinity is identified for each pair of documents with one document of the pair being the document and the other document of the pair being another document in the collection of documents, affinity indicating to what extent the information of one document is subsumed by the information of another document;
determining by the processor information richness for each document in the collection based on an element of a normalized affinity matrix that is derived from an affinity matrix;
storing in the memory indications of the determined information richnesses of the documents in the collection; and
ranking the documents based on the stored indications of information richnesses, wherein the determined information richness for each document is defined as $$InfoRich(d_i) = \sum_{all\ j \neq i} InfoRich(d_j) \cdot \tilde{M}_{ji}$$

where InfoRich($d_i$) is the information richness of document $d_i$, document $d_i$ represents the document and document $d_j$ represents another document of the collection of documents, and $\tilde{M}_{ij}$ is an element of the normalized affinity matrix, wherein the affinity matrix containing the identified affinity of the document to the another documents in the collection, wherein the documents in the collection are web pages.

5. A computing device for calculating information richness of a document within a collection of web pages, the web pages having words, comprising:

a memory having computer-executable instructions and a processor for executing the computer-executable instructions stored in the memory, the executed computer-executable instructions perform steps comprising:

identifying an affinity of each web page in the collection has to the another web page in the collection, wherein the affinity is identified for each pair of web pages with one web page of the pair being the web page and the other web page of the pair being another web page in the collection of web pages, affinity indicating to what extent the information of one web page is subsumed by the information of another web page;

determining information richness for each web page in the collection based on an element of a normalized affinity matrix that is derived from an affinity matrix;

storing in the memory indications of the determined information richnesses of the web pages in the collection; and ranking the web pages based on the stored indications of information richnesses, wherein the determined information richness for each web page is defined as $$InfoRich(d_i) = \sum_{all\ j \neq i} InfoRich(d_j) \cdot \tilde{M}_{ji}$$

where $InfoRich(d_i)$ is the information richness of web page $d_i$, web page $d_i$ represents the web page and web page $d_j$ represents another web page of the collection of web pages, and $\tilde{M}_{ij}$ is an element of the normalized affinity matrix, wherein the affinity matrix containing the identified affinity of the web page to the another web page in the collection.

6. The computing device of claim 5 wherein the identifying of the affinity of each web page includes generating an affinity graph.

7. The computing device of claim 5 wherein the ranking of web pages includes submitting a query to a search engine service and receiving indications of the web pages as the search result.

8. The computing device of claim 7 wherein the ranking is further based on a search-based relevance.

* * * * *

UNITED STATES PATENT AND TRADEMARK OFFICE
CERTIFICATE OF CORRECTION

PATENT NO. : 7,664,735 B2 Page 1 of 1
APPLICATION NO. : 10/837540
DATED : February 16, 2010
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 551 days.

Signed and Sealed this

Twenty-eighth Day of December, 2010

David J. Kappos
*Director of the United States Patent and Trademark Office*